(12) United States Patent
Sell

(10) Patent No.: US 9,387,846 B2
(45) Date of Patent: Jul. 12, 2016

(54) MODULATOR VALVE

(71) Applicant: TRAMEC SLOAN, LLC, Iola, KS (US)

(72) Inventor: Edward D. Sell, Iola, KS (US)

(73) Assignee: Tramec Sloan, LLC, Iola, KS (US)

( * ) Notice: Subject to any disclaimer, the term of this patent is extended or adjusted under 35 U.S.C. 154(b) by 0 days.

(21) Appl. No.: 14/603,023

(22) Filed: Jan. 22, 2015

(65) Prior Publication Data

US 2015/0246666 A1 Sep. 3, 2015

Related U.S. Application Data

(60) Provisional application No. 61/946,386, filed on Feb. 28, 2014.

(51) Int. Cl.
| | | |
|---|---|---|
| *B60T 15/02* | (2006.01) | |
| *B60T 15/36* | (2006.01) | |
| *B60T 15/18* | (2006.01) | |
| *B60T 8/18* | (2006.01) | |
| *B60T 8/34* | (2006.01) | |

(52) U.S. Cl.
CPC .............. *B60T 15/027* (2013.01); *B60T 8/349* (2013.01); *B60T 15/18* (2013.01); *B60T 15/36* (2013.01); *B60T 8/1843* (2013.01); *B60T 8/34* (2013.01)

(58) Field of Classification Search
CPC ....... B60T 15/027; B60T 15/36; B60T 15/18; B60T 8/349; B60T 8/34; B60T 8/1843; B60T 8/342
USPC ............... 303/119.2, 40, 118.1, 115.1, 115.2, 303/9.69; 137/102, 103, 105, 627.5, 137/625.25, 625.67, 625.68, 625.69, 596.18
See application file for complete search history.

(56) References Cited

U.S. PATENT DOCUMENTS

| | | | | |
|---|---|---|---|---|
| 3,695,732 A | * | 10/1972 | Stelzer | .................. B60T 8/4233 188/181 A |
| 3,758,167 A | * | 9/1973 | Machek | .............. B60T 8/17633 303/118.1 |
| 3,902,764 A | * | 9/1975 | Sebo | ...................... B60T 8/5018 303/118.1 |
| 3,944,294 A | * | 3/1976 | Masuda | ................ B60T 8/1831 137/596.18 |
| 3,946,760 A | | 3/1976 | Murakami et al. | |
| 4,017,125 A | | 4/1977 | Durling | |
| 4,035,034 A | | 7/1977 | Sekiguchi | |
| 4,129,341 A | | 12/1978 | Pauwels | |
| 4,145,091 A | * | 3/1979 | Bueler | .................... B60T 17/18 303/118.1 |
| 4,175,794 A | | 11/1979 | Pauwels | |
| 4,182,536 A | | 1/1980 | Pauwels | |
| 4,444,437 A | | 4/1984 | Mortimer | |

(Continued)

FOREIGN PATENT DOCUMENTS

| | | |
|---|---|---|
| CA | 2753457 C | 9/2010 |
| EP | 0498584 B1 | 8/1992 |

*Primary Examiner* — Thomas J Williams
*Assistant Examiner* — Mariano Sy
(74) *Attorney, Agent, or Firm* — Winston & Strawn LLP

(57) ABSTRACT

A modulator valve for use with the auxiliary axle anti-lock braking system of a truck, configured and constructed such that no braking application pressure signal is permitted to be delivered to the auxiliary axle anti-lock braking system when the auxiliary axle is in the lifted position, and a modulated braking application pressure signal is delivered to the auxiliary axle anti-lock braking system when the auxiliary axle is not in the lifted position. The modulated braking application pressure depends upon the pressure sensed from ride springs of the suspension system of the truck.

19 Claims, 11 Drawing Sheets

(56) References Cited

U.S. PATENT DOCUMENTS

| | | | |
|---|---|---|---|
| 4,609,013 A | 9/1986 | Takahashi | |
| 4,637,662 A * | 1/1987 | Brown | B60T 8/3635 303/10 |
| 4,696,521 A | 9/1987 | McCann et al. | |
| 4,760,867 A | 8/1988 | Takahashi | |
| 4,765,371 A | 8/1988 | Takahashi | |
| 4,926,907 A * | 5/1990 | Fauck | B60T 8/18 137/627.5 |
| 4,973,108 A * | 11/1990 | Maki | B60T 8/42 303/118.1 |
| 5,007,455 A * | 4/1991 | Hawker | B60T 8/361 137/596.16 |
| 5,151,203 A * | 9/1992 | Riley | C04B 28/04 106/606 |
| 5,722,740 A * | 3/1998 | Engelbert | B60T 8/1708 303/118.1 |
| 5,979,503 A * | 11/1999 | Abboud | B60T 8/362 137/596.17 |
| 6,209,971 B1 * | 4/2001 | Ho | B60T 8/343 303/119.2 |
| 6,247,764 B1 * | 6/2001 | Koelzer | B60T 8/323 303/118.1 |
| 6,267,135 B1 * | 7/2001 | Ho | B60T 8/342 137/102 |
| 6,305,759 B1 * | 10/2001 | Ho | B60T 8/361 303/118.1 |
| 6,308,793 B1 * | 10/2001 | Eberling | B60G 17/0195 137/625.66 |
| 6,386,649 B1 * | 5/2002 | Ross | B60T 8/361 303/118.1 |
| 6,523,625 B2 * | 2/2003 | Eberling | B60G 17/0155 180/24.02 |
| 6,769,744 B2 | 8/2004 | Marsh et al. | |
| 7,077,481 B2 | 7/2006 | Marsh et al. | |
| 7,905,557 B2 | 3/2011 | Frank et al. | |
| 2003/0020329 A1 * | 1/2003 | Herbst | B60T 8/3675 303/119.2 |
| 2005/0110342 A1 * | 5/2005 | Eberling | B60T 17/081 303/115.1 |
| 2008/0030068 A1 * | 2/2008 | Bensch | B60T 7/20 303/17 |
| 2010/0181823 A1 * | 7/2010 | Eberling | B60T 7/12 303/9.76 |
| 2011/0297494 A1 * | 12/2011 | Shaw | B60T 8/327 188/152 |
| 2013/0214588 A1 * | 8/2013 | Kiel | B60T 13/683 303/6.01 |
| 2013/0304343 A1 | 11/2013 | Feyerabend et al. | |
| 2015/0123460 A1 * | 5/2015 | Prescott | B60T 8/327 303/40 |

* cited by examiner

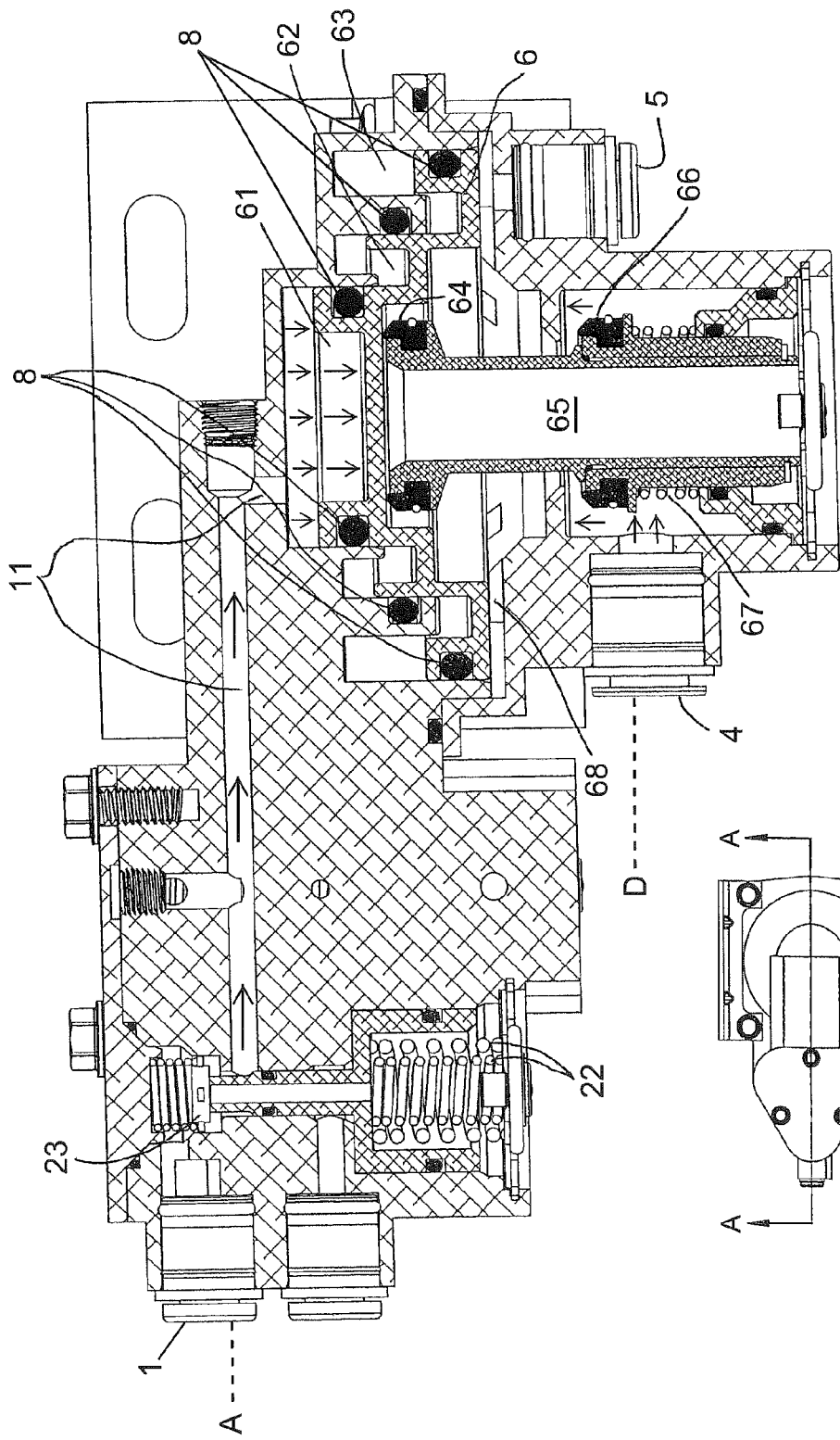

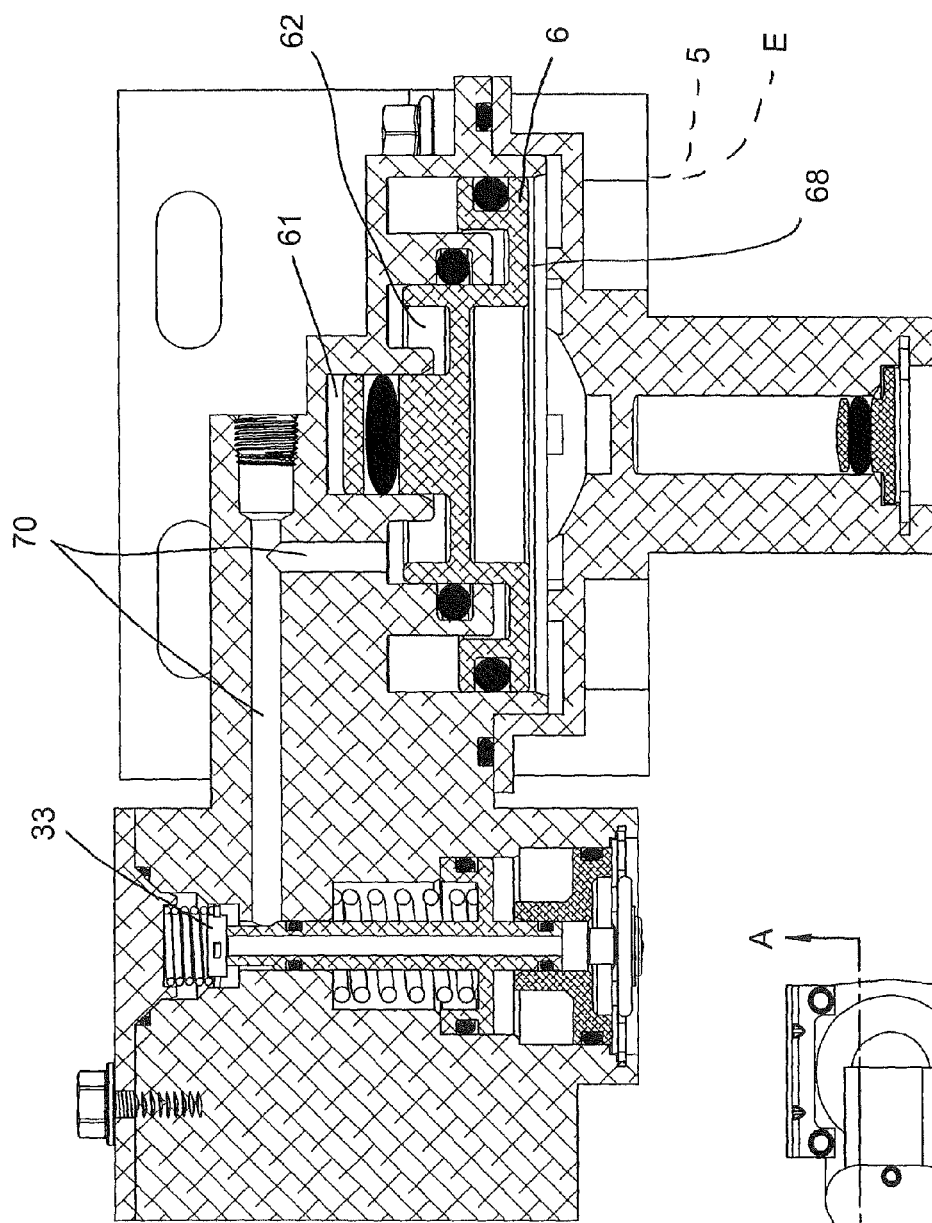
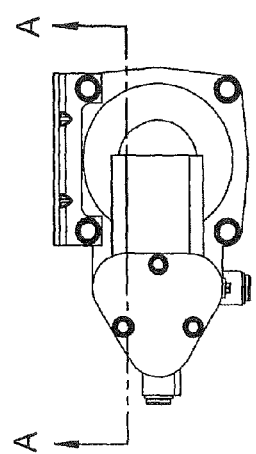
FIG. 8
FIG. 8S

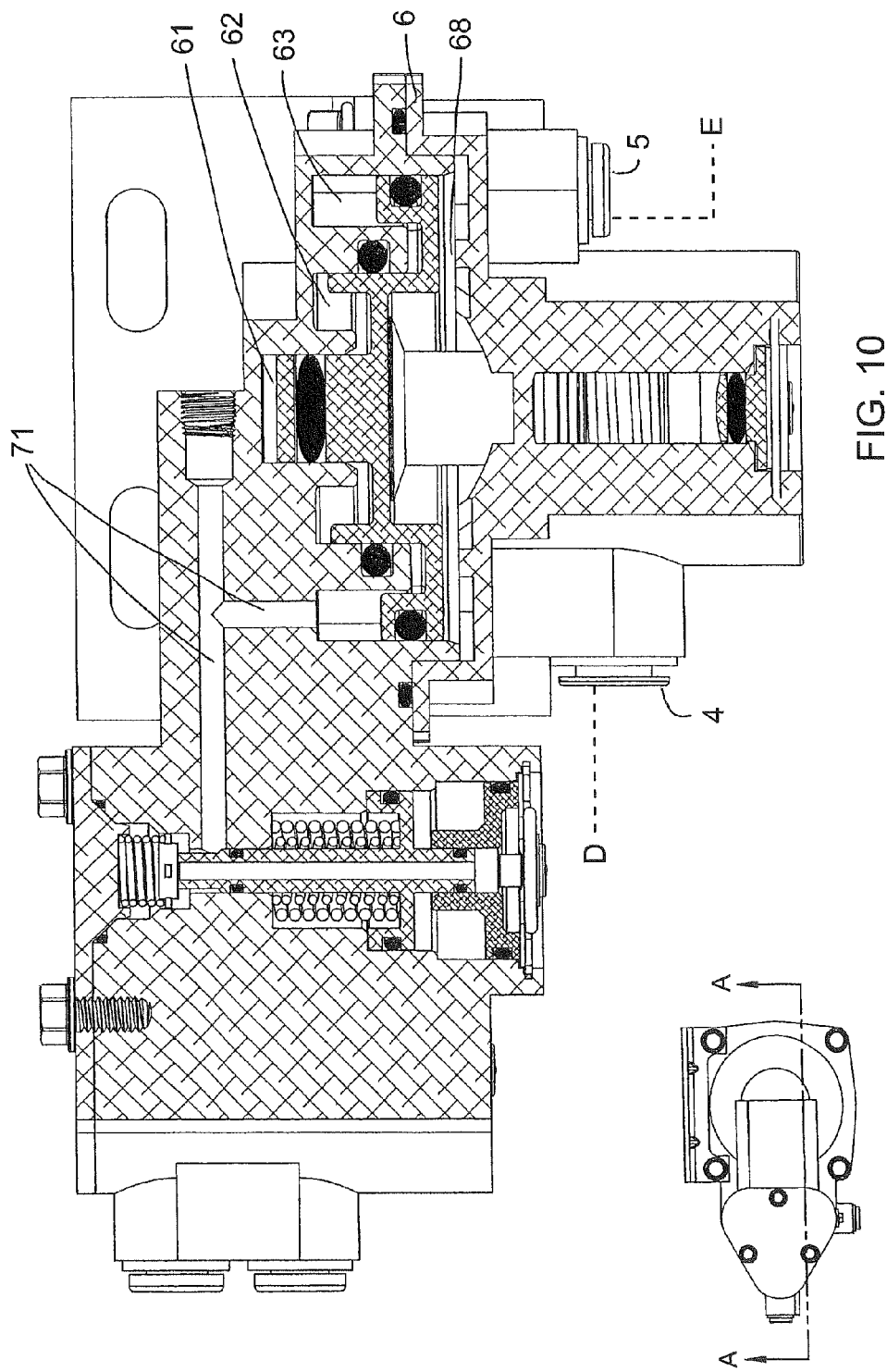

MODULATOR VALVE

This application claims the benefit of provisional application No. 61/946,386 filed Feb. 28, 2014, the entire content of which is expressly incorporated herein by reference thereto.

FIELD OF THE INVENTION

The present invention relates to a modulator valve for use with the auxiliary axle anti-lock brake system of a truck.

BACKGROUND OF THE INVENTION

In the truck-tractor industry, the number of axles required on the ground is determined by the load carried by the vehicle. When lighter weight tractors are towed, often only one rear axle is required to accommodate the load (the "primary axle"). As the load weight increases, however, an additional axle may be required to carry the added weight (the "auxiliary axle"). The primary axle is connected to the engine to provide the driving force. The auxiliary axle, when in use, only provides load distribution to the rolling surface and does not provide any driving force.

On trucks with two rear axles, it has been demonstrated that if the load can be carried by one axle, fuel consumption is significantly reduced if the auxiliary axle is lifted so as to not contact the rolling surface. This lifting is typically accomplished through the use of air springs (referred to herein as "lift springs") and leverage to pivot the auxiliary axle off of the rolling surface. Trucks with this configuration are commonly referred to as 6×2 systems (six wheel-ends with two drive wheel-ends) Systems designed to lift the auxiliary axle off of the rolling surface are well known in the prior art.

Tractors are commonly fitted with a suspension system that adjusts to the weight being carried through the use of air springs (referred to herein as "ride springs"). These springs are filled with pressurized air from the truck's compressor. As the trailer load increases, the air pressure in the ride springs is increased to maintain the proper position of the frame relative to the vehicle's axles. The adjustment of the pressure in the ride springs is accomplished by automatic systems. Through the function of the suspension system, the auxiliary axle and primary axle may not carry the same amount of load.

Federal vehicle safety standards require that all wheels on these trucks be provided with anti-lock brake systems. These brake systems monitor wheel motion during braking to limit wheel lock-up and improve control and stopping distance. The system has a relay valve which receives a braking signal from the driver as a low volume pneumatic pressure and then relays that signal pressure to the service brake chamber with a high volume flow to fill the chamber quickly at the requested pressure. When anti-lock brake system braking systems are used with an auxiliary axle, certain problems can occur.

Specifically, when the auxiliary axle is lifted, undesirable "false events" may be recorded as lock-up by the anti-lock brake system if the system detects that the lifted wheels are not turning during a brake application. To avoid this, separate anti-lock brake system controllers can be used with the lift axle, but the application signal pressure from the vehicle's primary service brake system must be turned off when the auxiliary axle is in the lifted position. When the auxiliary axle is lowered to carry the load, the service application signal must be turned back on to enable the brakes on the wheels attached to the auxiliary axle. Inversion valves, which can be used to shut off pneumatic output based on pneumatic pressure at another location, are known in the art for use to disable the anti-lock brake system in the auxiliary axle when it is in the lifted position, but these are separate devices that are applied to each line.

Additionally, when the auxiliary axle is not lifted, the auxiliary axle and the primary axle may not carry the same amount of load. This causes the contact pressure between the tires and the rolling surface to be different on the primary and auxiliary axles. Because the driver of the truck only has the ability to apply one control pressure, both the axles receive the same braking signal. If the load on the auxiliary axle is lower than that on the primary axle, the wheels on the auxiliary axle may lock-up, generating an anti-lock brake system event. This locking of the wheels can result in the tires being dragged along the road surface, causing wear and flat spots which ruin the tires, which results in added replacement and disposal expense.

There are currently devices known as load sensing valves that adjust output relative to the input based on preset mechanical and pneumatic adjustments, but these adjustments must be made specific to the installation, require complicated calculations, and are subject to installation errors. Accordingly, there is a need in the art for improvements in such devices, and these are now provided by the present invention.

SUMMARY OF THE INVENTION

The present invention now combines all of the functions discussed above into a single self-contained modulator valve device for better control and operation of vehicle braking when the auxiliary axle is lifted. The present device receives the driver's brake application signal from the primary air brake control system, and allows delivery to the anti-lock brake system relay valve only when the auxiliary axle is not in the lifted position. Moreover, when the auxiliary axle is not in the lifted position, the device modulates the delivery signal to the auxiliary axle braking system to a percentage of the input signal based on predetermined ride spring pressure ranges.

The present invention provides a number of features that contribute to improved operation and control of vehicle braking when the auxiliary axle is lifted. One feature is the automatic shut off the driver's brake control signal to the auxiliary axle anti-lock brake system when the auxiliary axle is in the lifted position. Another feature is the determination of the relative load carried by the auxiliary axle by measuring the air pressure in the auxiliary ride springs. The present invention also modulates the application pressure sent to the auxiliary axle anti-lock brake system relay valve proportionally to the load being carried by that axle. Yet another feature is the ability to universally install the device on different vehicles without having to perform complex mechanical or pneumatic adjustments.

The invention now provides a modulator valve for installation in the braking system of an auxiliary axle. The modulator valve has a valve body that includes a control port for receiving a brake application pressure signal from the driver's primary braking system; a lift port for receiving a pressure signal from an auxiliary axle lifting system; a ride port for receiving a pressure signal from a suspension system comprised of ride springs; a supply port for receiving a pressure signal from a supply reservoir; and a delivery port for delivering a pressure signal to the auxiliary axle's anti-lock brake system.

Operatively connected to the control port and lift port is a first piston, spring, and valve configuration such that when the auxiliary axle is lifted, no brake application pressure signal is allowed to pass the first piston, spring, and valve configuration, and when the auxiliary axle is not lifted, a brake application pressure signal is allowed to pass the first piston, spring, and valve configuration.

Operatively connected to the control port, supply port, and delivery port is a modulator piston having an upper surface and a lower surface. The upper surface is separated into distinct areas. The lower surface area of the modulator piston comprises 100% of the sum of the areas of the upper surface of the modulator piston. The lower surface area of the modulator piston is operatively connected to the delivery port. When a brake application pressure signal is received by one or more areas of the upper surface of the modulator piston, the lower surface of the modulator piston in conjunction with pressure from the supply reservoir operates to deliver a modulated pressure signal to the auxiliary axle anti-lock brake system. Also, the ride port is associated with a restricting orifice to dampen vibration effects during operation.

Operatively connected to the control port, ride port, and modulator piston is a second piston, spring, and valve configuration. The second piston, spring, and valve configuration senses pressure from the ride springs that are part of the truck's suspension system. When the pressure from the ride springs is less than a certain pressure $X_1$, the second piston, spring, and valve configuration operates such that the braking application pressure signal is only felt on one of the distinct areas of the upper surface of the modulator piston. When the pressure signal from the ride springs is greater than a certain threshold $X_1$, the second piston, spring, and valve configuration operates such that a brake application pressure signal is delivered to more than one distinct area of the upper surface of the modulator piston.

Because the force applied to the upper surface of the modulator piston is only applied to a fraction of the total surface area of the upper surface of the modulator piston, the delivery pressure signal applied to the lower surface of the modulator piston need only be a proportionate fraction of the braking application pressure signal to equalize pressure between the upper and lower surfaces of the modulator piston. In other words, if the braking application pressure signal is applied to 50% of the upper surface area of the modulator piston, then only 50% of the brake application pressure signal need be applied to the lower surface of the modulator piston to equalize pressure the two surfaces of the modulator piston, thereby delivering a pressure signal to the auxiliary axle anti-lock brake system that is 50% of the braking application pressure signal.

In a particular embodiment of the invention, the upper surface of the modulator piston is separated into three distinct areas. The first area preferably comprises 25% of the total area of the upper surface of the modulator piston. The combined areas of the first and second area preferably comprise 50% of the total area of the upper surface of the modulator piston. When ride spring pressure is less than $X_1$, the braking application pressure signal is delivered only to the first area of the upper surface of the modulator piston. When ride spring pressure is greater than $X_1$ but less than $X_2$, the braking application pressure signal is delivered to the first and second areas of the upper surface of the modulator piston. When ride spring pressure is greater than $X_2$, the braking application pressure signal is delivered to the entire upper surface of the modulator piston. In the above three scenarios, the preferred pressure signal delivered to the auxiliary axle anti-lock brake system will be 25%, 50%, and 100% of the brake application pressure signal, respectively.

BRIEF DESCRIPTION OF THE FIGURES

Other features and advantages of the invention will be better understood in the light of the detailed description that follows, with reference to the appended drawings in which:

FIG. 3S shows that the cross-section of FIG. 3 is taken along lines A-A of FIG. 3S;

FIG. 5 illustrates a cross section of the invention with a pressure signal from the driver's primary braking system A with the auxiliary axle not lifted;

FIG. 5S shows that the cross-section of FIG. 5 is taken along lines A-A of FIG. 5S;

FIG. 8 illustrates the flow of control pressure from the driver's primary breaking system through passage 70 to area 62 of modulator piston 6 when ride spring pressure is greater than $X_1$, but less than $X_2$;

FIG. 8S shows that the cross-section of FIG. 8 is taken along lines A-A of FIG. 8S;

FIG. 10 illustrates the flow of control pressure from the driver's primary breaking system through passage 71 to area 63 of modulator piston 6 when the ride spring pressure is greater than $X_2$;

FIG. 10S shows that the cross-section of FIG. 10 is taken along lines A-A of FIG. 10S;

DETAILED DESCRIPTION OF THE INVENTION

The invention applies to a modulator valve for universal installation in tractors or trucks. The modulator operates to (1) automatically shut off the driver's brake control signal to the auxiliary axle anti-lock brake system when the auxiliary axle is in the lifted position, (2) determine the relative load carried by the auxiliary axle by measuring the air pressure in the auxiliary ride springs, and (3) modulate the application pressure sent to the auxiliary axle anti-lock brake system relay valve proportionally to the load being carried by that axle.

Figure 1:
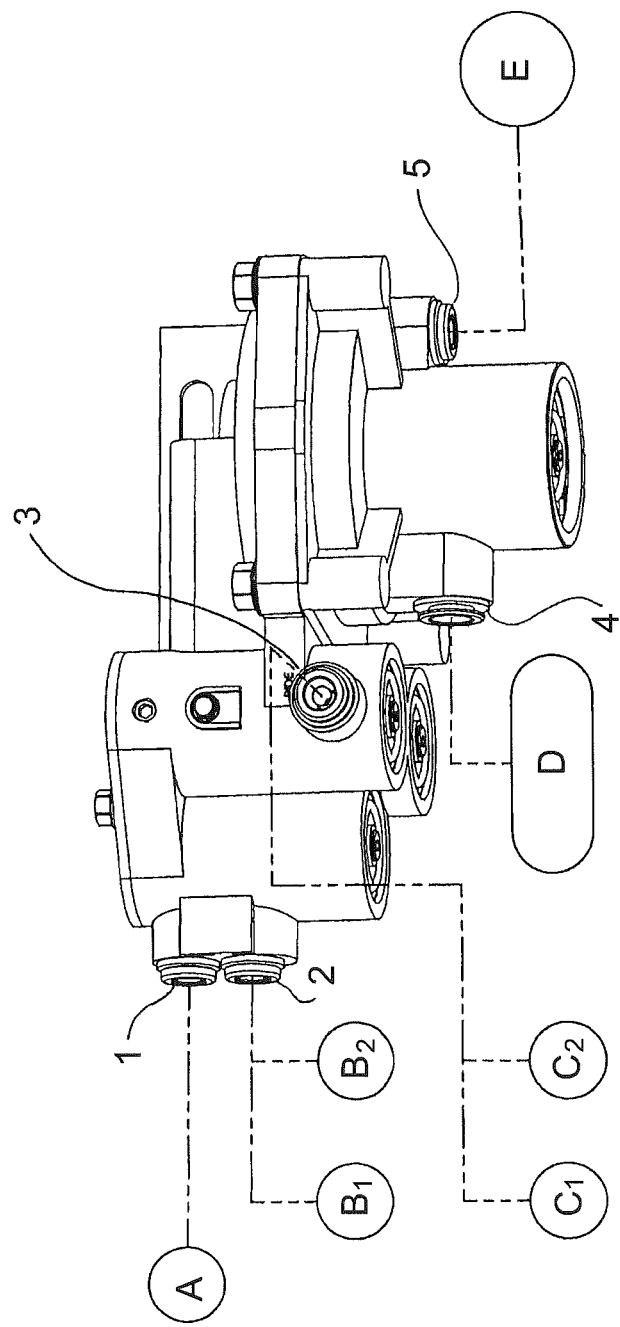
FIG. 1 illustrates an external view of the invention.

An external view of the invention is shown in FIG. 1. Control port 1 receives the brake application pressure signal from the driver's primary brake system A. Lift port 2 receives pressure from lift springs $B_1$ and $B_2$. Ride port 3 receives pressure from pneumatic ride springs $C_1$ and $C_2$. Supply port 4 receives pressure from the system supply reservoir D. Output to the auxiliary axle anti-lock brake system E is connected at delivery port 5.

Output pressure from delivery port 5 is preferably selected to be 25% of the pressure signal at control port 1 for any pressure at ride port 3 below $X_1$ pounds per square inch ("psi"). Output pressure from delivery port 5 is desired to be 50% of the pressure signal at control port 1 for any pressure at ride port 3 above $X_1$ psi, but less than $X_2$ psi, where $X_1$ is less than $X_2$. Output pressure from delivery port 5 is desired to be 100% of the pressure signal at control port 1 for any pressure at ride port 3 above $X_2$ psi.

The $X_1$ and $X_2$ pressures can be selected as desired and can vary over a wide range depending upon the vehicle to which the device is incorporated. Typically, $X_2$ is greater than $X_1$ by at least 10% to 50% or more. In preferred embodiments, $X_2$ may be 1, 2 or even 3 times greater than $X_1$ with $X_1$ being in the range of 25 to 75 psi. As noted, however, a skilled artisan can select the appropriate values for $X_1$ and $X_2$ for any particular vehicle.

Figure 2:
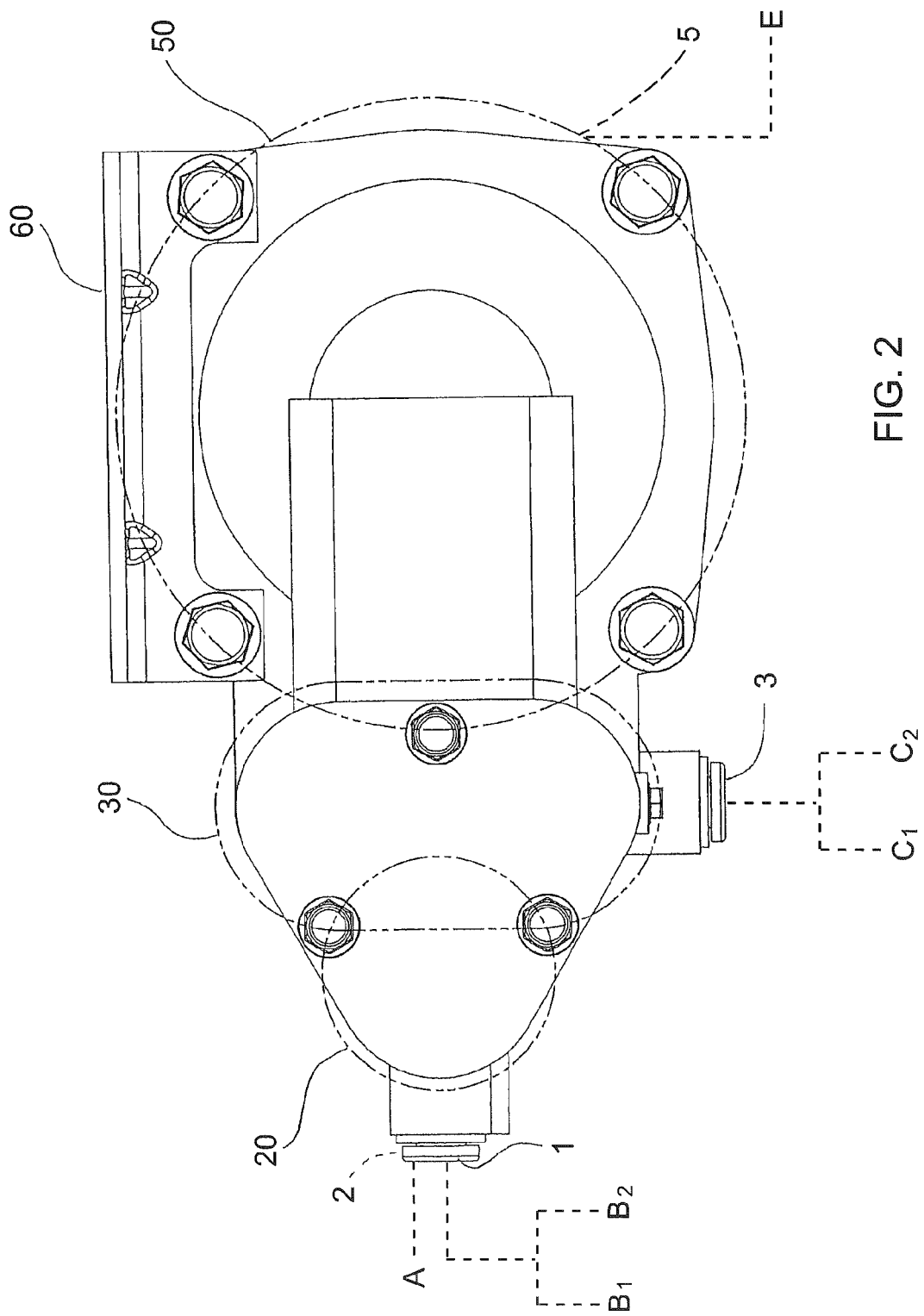
FIG. 2 illustrates a top view of the invention and annotates the functional regions of the various components.

FIG. 2 depicts a top view of the invention and annotates the functional regions of the various components. Lift sensing region 20 houses the components that receive pressure from lift springs $B_1$ and $B_2$. Ride pressure gauging region and control distribution region 30 houses the components that receive pressure from ride springs $C_1$ and $C_2$ and the brake application pressure from the driver's primary brake system A through control port 1. Delivery pressure modulation region 50 houses the components that effectuate delivery of a modulated pressure to the auxiliary axle anti-lock brake system through delivery port 5. Mounting bracket 60 allows for universal installation of the invention.

Figure 3:
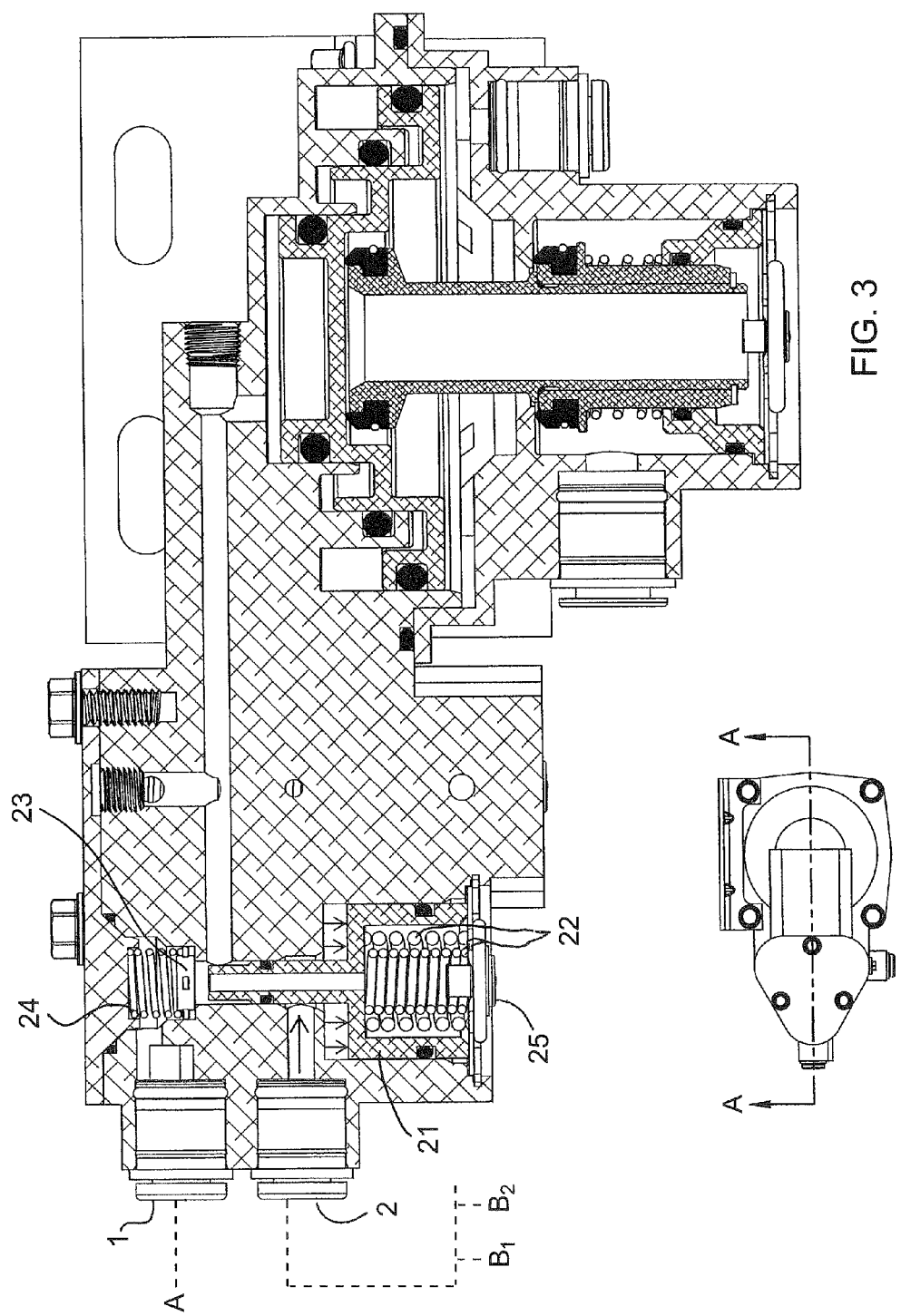
FIG. 3 illustrates a cross section of the invention along its centerline and shows the condition of the invention when the auxiliary axle is in the lifted position.

FIG. 3 depicts a cross section of the invention along its centerline and shows the condition of the invention when the auxiliary axle is in the lifted position. Pressure from lift springs $B_1$ and $B_2$ flows through lift port 2 and acts upon piston 21. The force exerted on piston 21 overcomes the return force of springs 22. Springs 22 therefore compress and the extension of piston 21 is held away from valve seal 23. As such, the return force of spring 24 is allowed to act upon valve seal 23 to seat and block pressure received from driver's primary brake system A through control port 1. The extension of piston 21 is hollow, venting any pressure to atmosphere through exhaust 25. Accordingly there will be no delivery of pressure to the auxiliary axle's anti-lock brake system relay because no pressure is passed to the modulation section of the invention, thereby preventing an undesirable false positive anti-lock brake system event.

Figures 4, 4S:
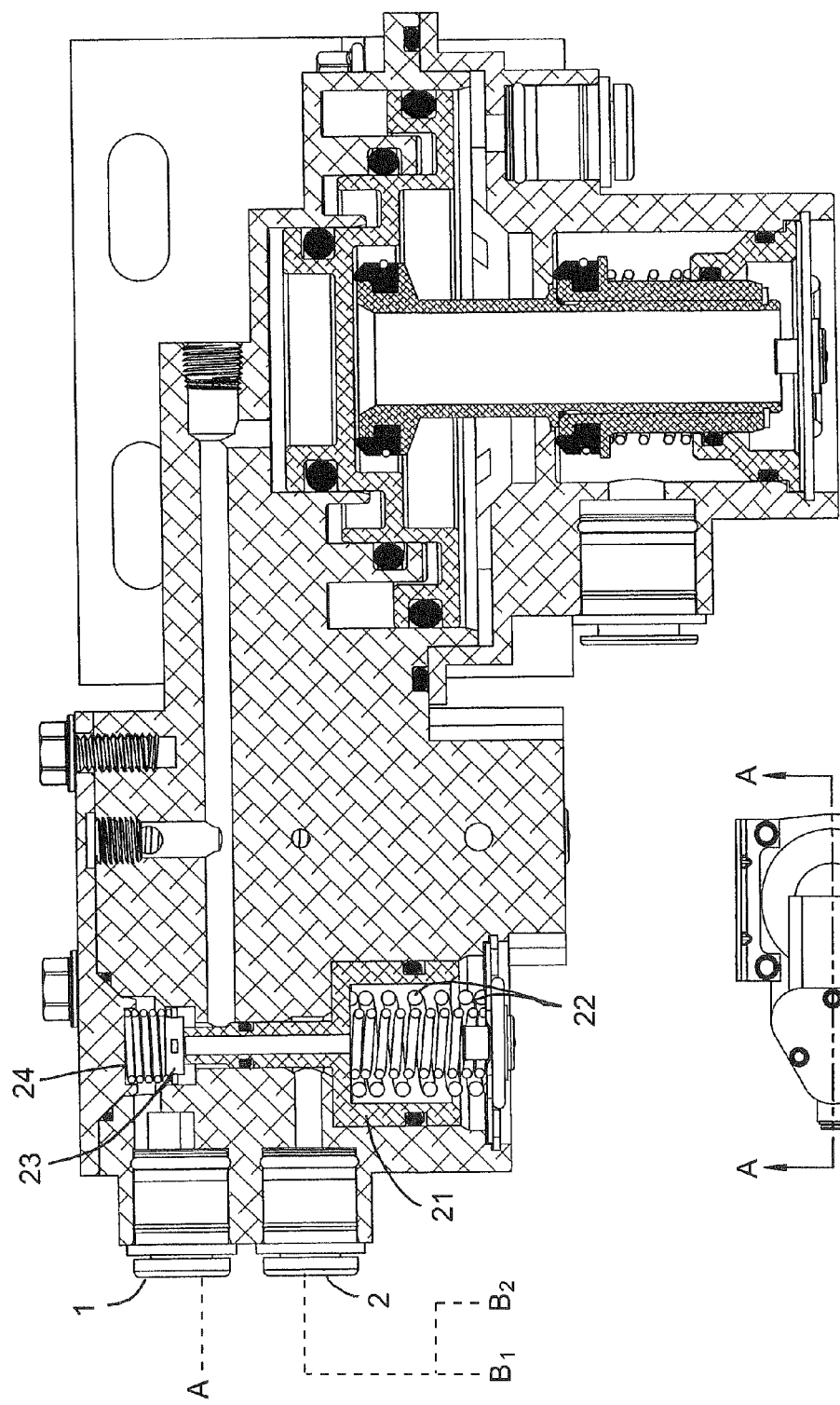
FIG. 4 illustrates a cross section of the invention along its centerline in normal operating condition with the auxiliary axle not lifted.
FIG. 4S shows that the cross-section of FIG. 4 is taken along lines A-A of FIG. 4S.

FIG. 4 shows a cross section of the invention along its centerline in normal operating condition with the auxiliary axle not lifted. Because the auxiliary axle is not lifted, there is no positive pressure at lift port 2. With no pressure on piston 21, return springs 22 are permitted to expand. Such expansion is strong enough so that the extension of piston 21 is allowed to act upon valve seal 23 and overcome the spring force of spring 24. This results in valve seal 23 being lifted off of its seat, thereby allowing flow into other functional areas of the device from the driver's primary braking system A in the event of a braking event. As shown, with no pressure applied at control port 1, there will be no delivery to the auxiliary axle's anti-lock brake system relay.

FIG. 5 shows the condition in which the auxiliary axle is not lifted, such that the positive control pressure from the driver's primary braking system A can flow though control port 1 and into pressure passage 11 into the downstream functions of the invention. Modulator piston 6 is separated by O-ring seals 8 into three separate areas, area 61, area 62, and area 63. Area 61 comprises 25% of the total area of modulator piston 6. Area 61 and area 62 combine to comprise 50% of the total area of modulator piston 6. Area 63 makes up the remainder of the total area of modulator piston 6, namely 25% of the total area.

The force generated by the control pressure acting on area 61 of modulator piston 6 forces modulator piston 6 downward to seat against seal 64 of exhaust tube 65. As control pressure rises, the force (area 61×control pressure) on modulator piston 6 rises and eventually overcomes the spring force of return spring 67, which unseats seal 66.

When seal 66 is unseated, supply pressure from supply reservoir D is permitted to flow through supply port 4, and act upon the bottom of modulator piston 6, area 68. Rising supply pressure on the bottom of modulator piston 6 flows out through delivery port 5 to signal anti-lock brake system E to apply braking pressure. As supply pressure rises at delivery port 5 and against the bottom of modulator piston 6, modulator piston 6 will rise until the force generated on the bottom of modulator piston 6 (area 68×delivery pressure) balances the force on the top of modulator piston 6 (area 61×control pressure). As the forces equalize, modulator piston 6 permits return spring 67 to move exhaust tube 65 upward until seal 66 seats and closes the supply.

Because area 61 in a preferred embodiment is only 25% of area 68, the delivery pressure at delivery port 5 need only be 25% of the control pressure from the driver's primary braking system A to equalize the forces felt on the top and bottom of modulator piston 6. Accordingly, the signal to the auxiliary axle anti-lock brake system E will be modulated to 25% of the control pressure sent to the brake system by the driver's primary braking system A. Area 61 can be between 15 and 33% of area 68 depending upon the specific braking system of the truck.

Figure 6:
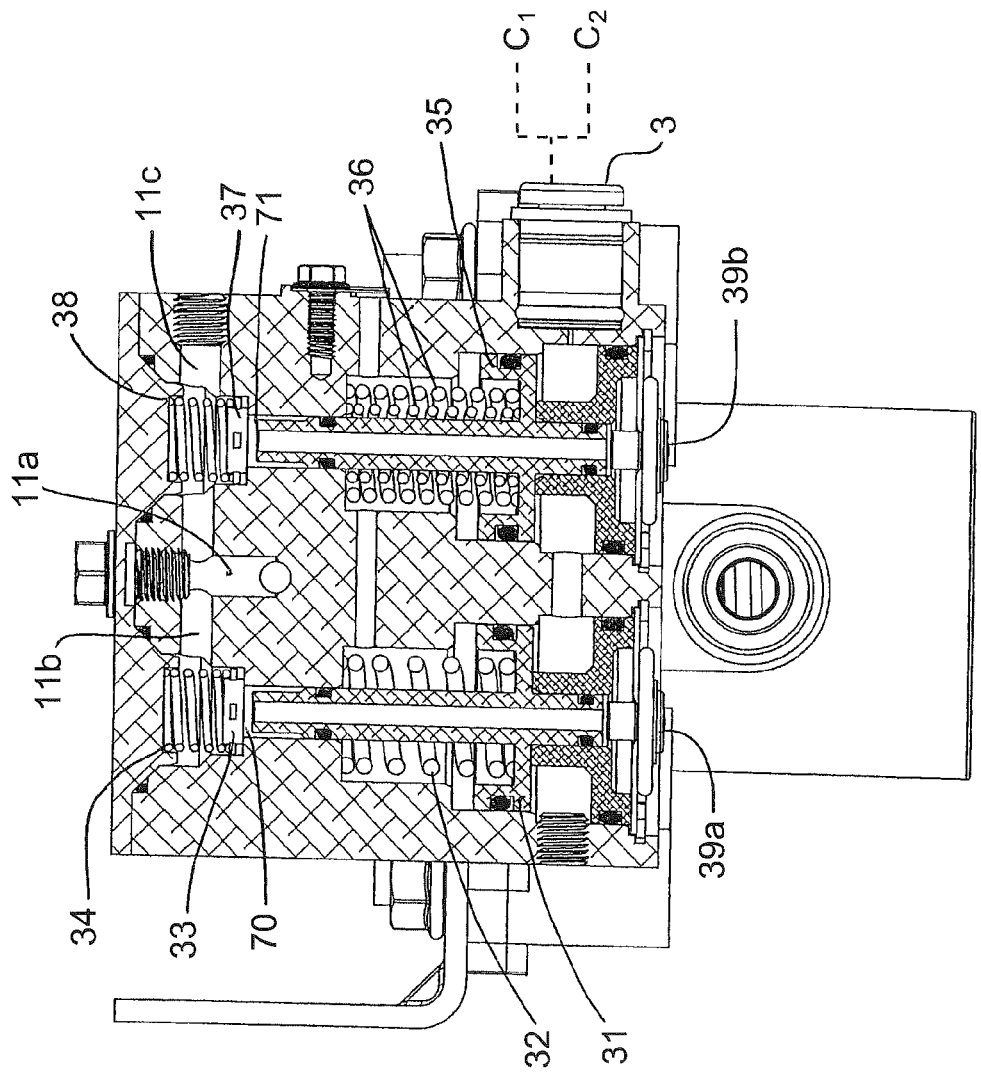
FIG. 6 illustrates a cross section of the ride pressure gauging portion of the device when ride spring pressure is less than $X_1$.
Figure 6S:
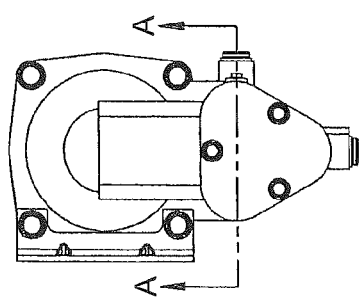
FIG. 6S shows that the cross-section of FIG. 6 is taken along lines A-A of FIG. 6S.

FIG. 6 shows a cross section of the ride pressure gauging portion of the device when ride spring pressure from ride springs $C_1$ and $C_2$ flowing through ride port 3 is less than trigger pressure $X_1$. In general, pressure from ride springs $C_1$ and $C_2$ acts upon gauging pistons 31 and 35. At pressures below $X_1$, springs 32 and 36 have sufficient spring force to hold the extended tube section of gauging pistons 31 and 35 away from seals 33 and 37. Seals 33 and 37 are held seated by springs 34 and 38. Seals 33 and 37 block flow of the control pressure from the driver's primary breaking system A (as shown in FIG. 5) from passages 11a, 11b, and 11c to passages 70 and 71, and then to the top of modulator piston 6 (as shown in FIG. 5). The hollow extensions of gauging pistons 31 and 35 are open to vent to atmosphere though exhaust ports 39a and 39b. The pressure from ride springs $C_1$ and $C_2$ is lower than trigger pressure $X_1$, so control pressure from the driver's primary brake system A is only at area 61 of modulator piston 6. Areas 62 and 63 are vented to atmosphere.

Figure 7:
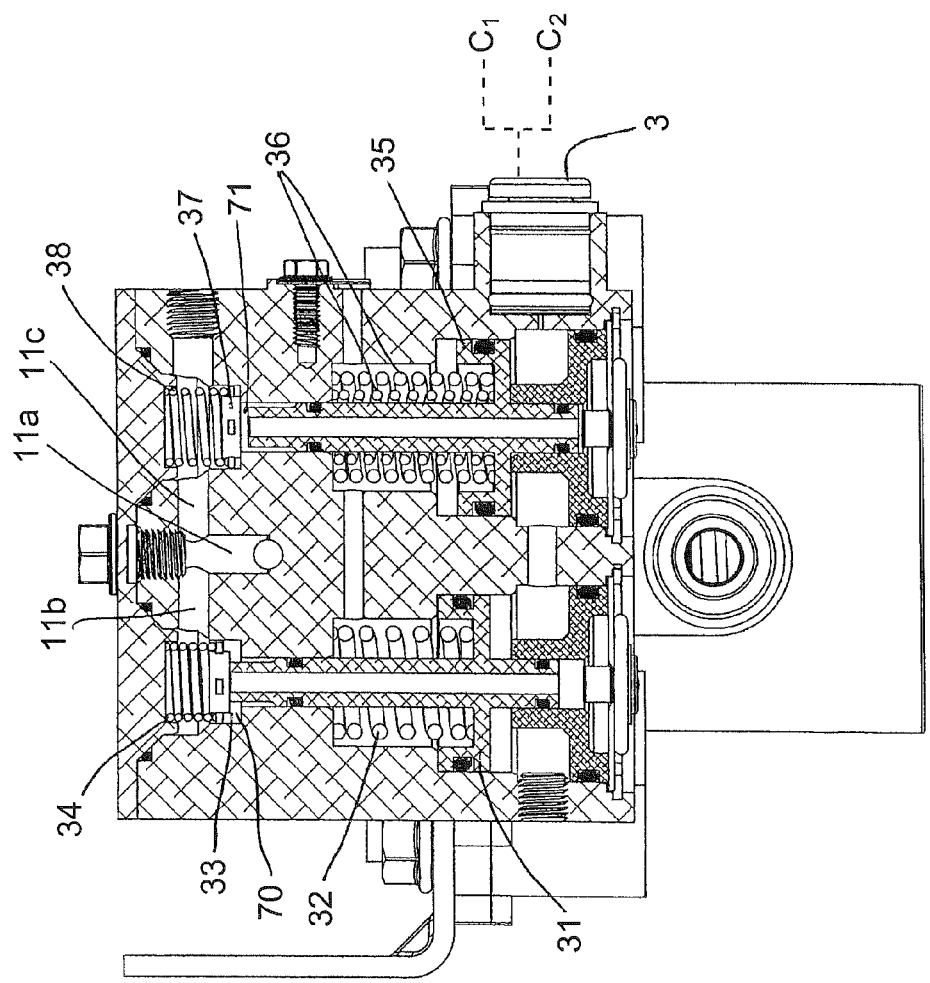
FIG. 7 illustrates a cross section of the ride pressure gauging portion of the device when ride spring pressure is greater than $X_1$, but less than $X_2$.
Figure 7S:
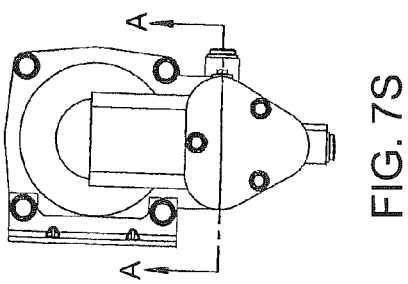
FIG. 7S shows that the cross-section of FIG. 7 is taken along lines A-A of FIG. 7S.

FIG. 7 shows a cross section of the ride pressure gauging portion of the device. In FIG. 7, the ride spring pressure from ride springs $C_1$ and $C_2$ is greater than trigger pressure $X_1$ but is less that trigger pressure $X_2$. Pressure from the ride springs $C_1$ and $C_2$ acts upon gauging pistons 31 and 35. At pressures above $X_1$, spring 32 is overcome by pressure applied to piston 31 and the tubular extension of gauging piston 31 is raised to press against seal 33. The force resulting from the extension of gauging piston 31 against seal 33 is sufficient to overcome the spring force of spring 34, thereby opening flow into passage 70, which allows control pressure to be felt at area 62 of modulator piston 6 (as shown in FIG. 8). Springs 36 are not compressed at pressures greater than $X_1$ but less than $X_2$. Therefore, the passage 71 remains closed at this range of ride spring pressures.

FIG. 8 illustrates the flow of control pressure from the driver's primary braking system through passage 70 to area 62 of modulator piston 6. Area 61 and area 62 are both exposed to control pressure when the ride pressure from ride springs C1 and C2 is greater than X1. Thus, the control pressure is preferably acting on an area equal to 50% of the total area on the top of modulator piston 6.

Because the combined area 61 and area 62 in the preferred embodiment is only 50% of area 68, the delivery pressure at delivery port 5 need only be 50% of the control pressure from the driver's primary braking system A to equalize the forces felt on the top and bottom of modulator piston 6. Accordingly, the signal to the auxiliary axle anti-lock brake system E will be modulated to 50% of the control pressure sent to the brake system by the driver's primary braking system A when ride pressure is greater than $X_1$ but less than $X_2$. When the combined area is a different proportion of area 68, the signal will be adjusted accordingly.

Figure 9:
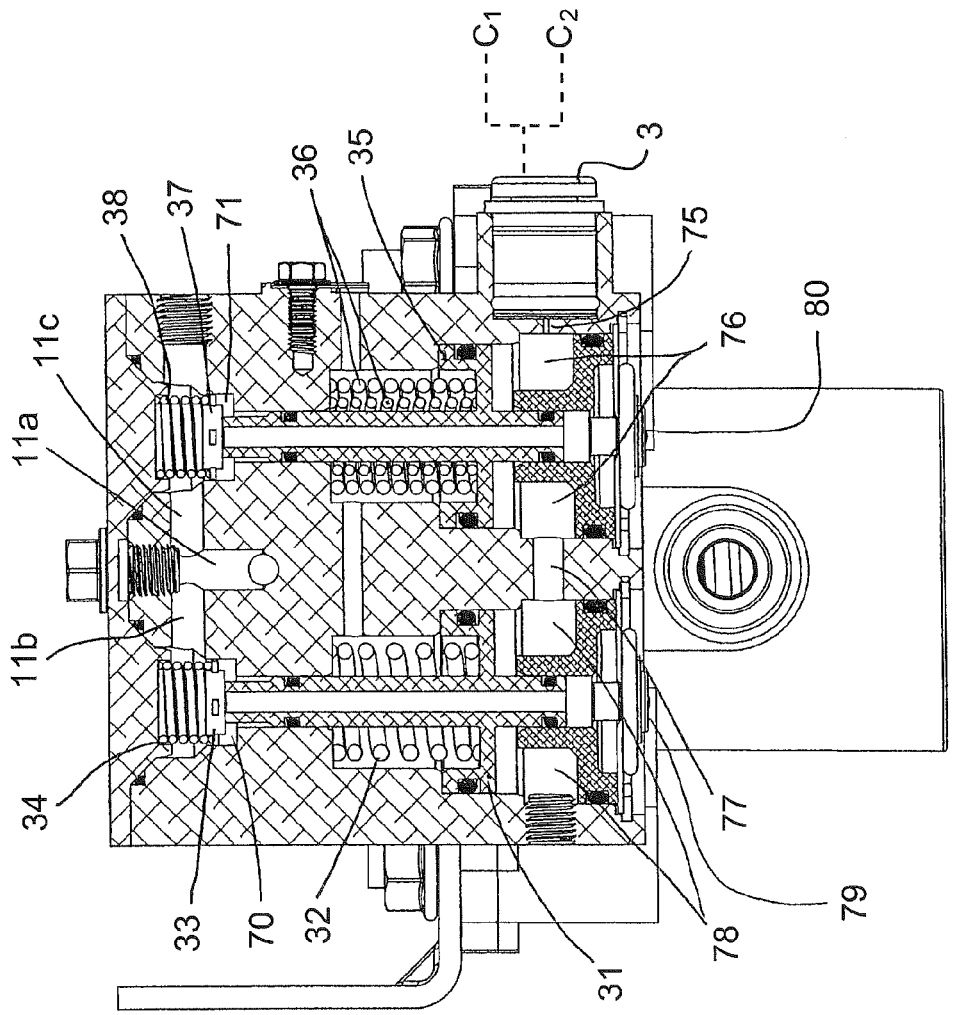
FIG. 9 illustrates a cross-section of the ride pressure gauging portion of the device when the ride spring pressure is greater than $X_2$.
Figure 9S:
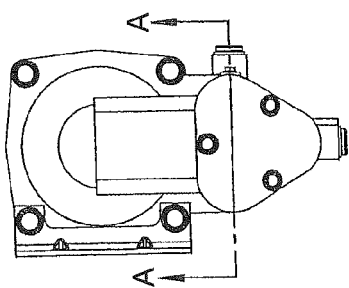
FIG. 9S shows that the cross-section of FIG. 9 is taken along lines A-A of FIG. 9S.

FIG. 9 shows in cross-section the ride pressure gauging portion of the device, when the ride spring pressure C1 and C2 is higher than the trigger pressure X2. Pressure from the ride springs flows through a restricting orifice 75 and then through chambers 76, 77 and 78 to act upon gauging pistons 35 and 31. The restricting orifice 75 dampens vibration effects. The ride springs C1 and C2 compress and expand as irregularities in the rolling surface are encountered, causing transient pressure changes in the ride springs. The restricting orifice 75 limits flow rates to or away from chambers 76, 77 and 78, thereby reducing transient pressure changes acting on pistons 31 and 35. At pressures above X2, springs 32 and 36 are overcome, moving the extended tube section of pistons 31 and 35 into contact with seals 33 and 37, which are held seated by springs 34 and 38. The hollow extensions of gauging pistons 31 and 35 are open to vent to atmosphere though exhaust ports 79 and 80. The passages 70 and 71 leading to the modulator piston 6, are opened to flow of the control pressure from passages 11a, 11b and 11c to the top of piston 6, as shown in FIGS. 8 and 10. The hollow extensions of pistons 31 and 35 are closed by seals 33 and 37.

FIG. 10 illustrates the flow of control pressure from the driver's primary breaking braking system through passage 71 to area 63 of modulator piston 6. Areas 61, 62, and 63 are all exposed to control pressure when the ride pressure from ride springs C1 and C2 is greater than X2. Thus, the control pressure is acting on an area equal to 100% of the total area on the top of modulator piston 6.

Because the combined areas of area 61, 62 and area 63 is 100% of area 68, the delivery pressure at delivery port 5 must be 100% of the control pressure from the driver's primary braking system A to equalize the forces felt on the top and bottom of modulator piston 6. Accordingly, the signal to the auxiliary axle anti-lock brake system E will be 100% of the control pressure sent to the brake system by the driver's primary braking system A when ride pressure is greater than $X_2$.

Figures 11, 11S:
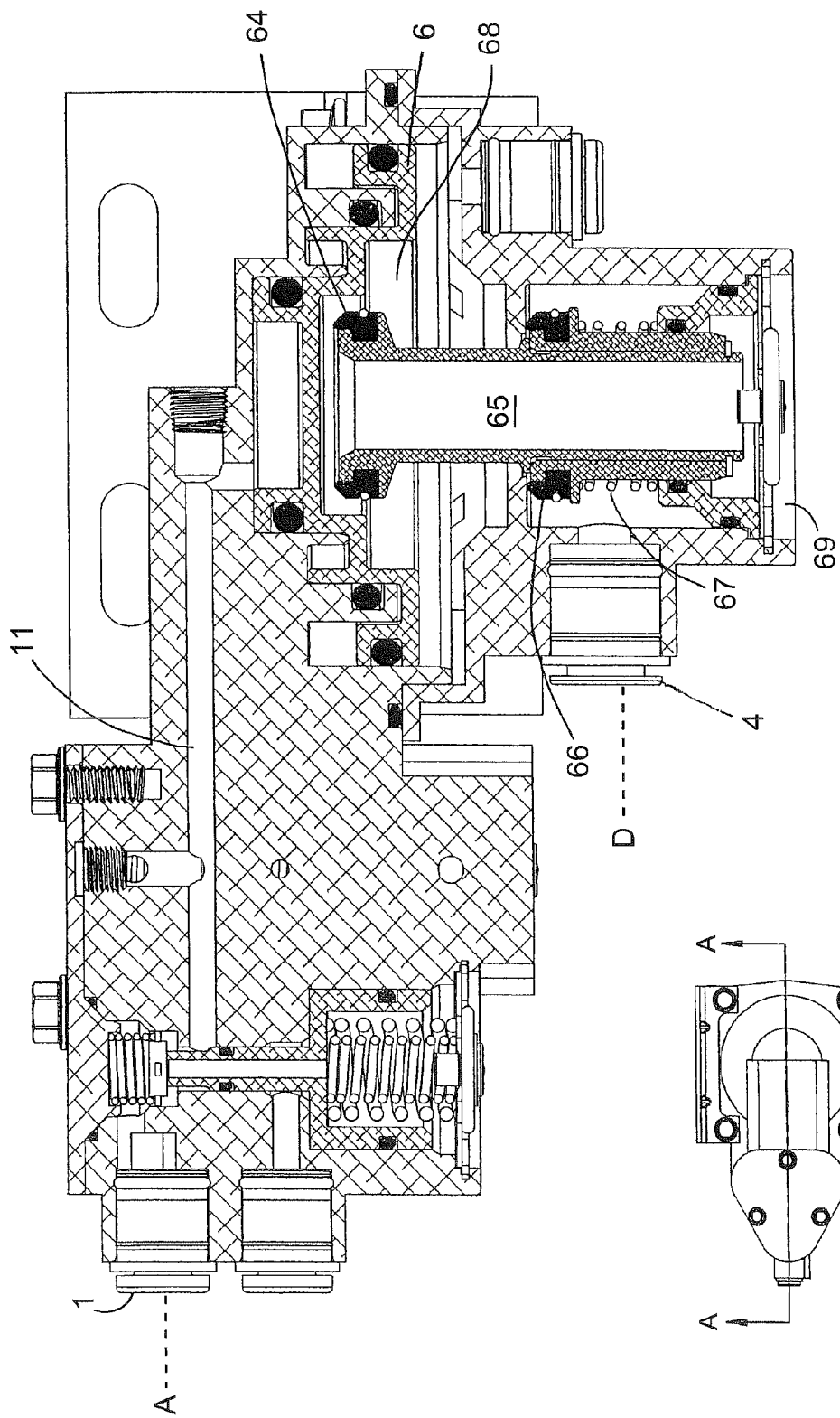
FIG. 11 illustrates the exhaust phase of the invention.
FIG. 11S shows that the cross-section of FIG. 11 is taken along lines A-A of FIG. 11S.

FIG. 11 depicts the exhaust phase of the invention. The driver has released the brake application, venting the control pressure from control port 1, passage 11, and the top of modulator piston 6. Once the forces on top of modulator piston 6 are removed, the delivery pressure acting on area 68 will cause modulator piston 6 to lift off of seal 64. This allows delivery pressure to flow through exhaust tube 65 and out to the atmosphere through exhaust 69. Additionally, after pressure is vented from modulator piston 6, the force of spring 67 acts to reseat seal 66, thereby preventing pressure from supply reservoir D from acting upon area 68.

The exemplary embodiment has been described with reference to the non-limiting preferred embodiments. Obviously, modification and alterations will occur to others upon reading and understanding the preceding detailed description. As noted above, the preferred area ratios can be varied as desired for optimizing performance without departing from the invention. It is intended that the exemplary embodiment be construed as including all such modification and alterations insofar as they come within the scope of the appended claims or equivalents thereof.

What is claimed is:

1. A modulator valve for installation in a vehicle braking system wherein the vehicle has an auxiliary axle, with the valve having a valve body comprising:
   a control port for receiving a brake application pressure signal;
   a lift port for receiving a pressure signal from a lifting system for the auxiliary axle;
   a ride port for receiving a pressure signal from a suspension system for the auxiliary axle, with the suspension system including ride springs;
   a supply port for receiving a pressure signal from a supply reservoir;
   a delivery port for delivering a pressure signal to an anti-lock brake system of the auxiliary axle;
   a piston, spring, and valve arrangement operatively connected to the control port and the lift port and configured and dimensioned such that when the auxiliary axle is lifted no brake application pressure signal is allowed to pass to the delivery port, and when the auxiliary axle is not lifted a brake application pressure signal is allowed to pass to the delivery port.

2. The modulator valve according to claim 1, wherein the piston, spring, and valve arrangement includes a modulator piston operatively connected to the control port, supply port, and delivery port, wherein the modulator piston has an upper surface separated into distinct areas configured to receive a percentage of the brake application pressure signal, and a lower surface of the modulator piston operatively connected to the supply port and the delivery port such that when a brake application pressure signal is applied to the upper surface of the modulator piston, a modulated pressure signal is delivered through the delivery port to the anti-lock brake system of the auxiliary axle.

3. The modulator valve according to claim 2 further comprising a second piston, spring, and valve arrangement operatively connected to the control port, ride port, and modulator piston, configured and dimensioned to deliver a brake application pressure signal only to a certain distinct area of the upper surface of the modulator piston when the pressure signal from the ride springs is less than a certain threshold $X_1$; and to deliver a brake application pressure signal to more than one distinct area of the upper surface of the modulator piston when the pressure signal from the ride springs is greater than a certain threshold $X_1$.

4. The modulator valve according to claim 2, wherein the upper surface of the modulator piston is separated into at least three distinct areas, with a first area amounting to 25% of the total area and the lower surface has an area that is the same as the sum of the two areas of the upper surface of the modulator piston.

5. The modulator valve according to claim 1, wherein when the pressure signal from the ride springs is less than $X_1$, the pressure signal delivered to the anti-lock brake system of the auxiliary axle by the valve is 25% of the brake application pressure signal.

6. The modulator valve according to claim 1, wherein when the pressure signal from the ride springs is greater than $X_1$, the pressure signal delivered to the anti-lock brake system of the auxiliary axle by the valve is 50% of the brake application pressure signal.

7. The modulator valve according to claim 1, wherein when the pressure signal from the ride springs is greater than $X_2$, the pressure signal delivered to the anti-lock brake system of the auxiliary axle by the valve is 100% of the brake application pressure signal.

8. The modulator valve according to claim 3, wherein the second piston, spring, and valve arrangement operatively connected to the control port, ride port, and modulator piston, is further configured and dimensioned to deliver the brake application pressure signal to more than one distinct area of the upper surface of the modulator piston when the pressure signal from the ride springs is greater than a certain threshold $X_1$, but less than a certain threshold $X_2$, and to deliver a brake application pressure signal to more than two distinct areas of the upper surface of the modulator piston when the pressure signal from the ride springs is greater than a certain threshold $X_2$.

9. The modulator valve according to claim 8, wherein the upper surface of the modulator piston is separated into at least three distinct areas.

10. The modulator valve according to claim 9, wherein a first area is 25% of the total area.

11. The modulator valve according to claim 9, wherein a first area and a second area sum to equal 50% of the total area of the upper surface of the modulator valve.

12. The modulator valve according to claim 9, wherein the three distinct areas are equal in size.

13. The modulator valve according to claim 1 further comprising a restricting orifice associated with the ride port to dampen vibration effects during operation.

14. A modulator valve for installation in a braking system of an auxiliary axle, the valve having a valve body comprising:
   a control port for receiving a brake application pressure signal;
      a lift port for receiving a pressure signal from a lifting system for the auxiliary axle;
      a ride port for receiving a pressure signal from a suspension system for the auxiliary axle, with the suspension system including ride springs;
      a supply port for receiving a pressure signal from a supply reservoir;
      a delivery port for delivering a pressure signal to the anti-lock brake system of the auxiliary axle;
      a piston, spring, and valve arrangement operatively connected to the control port and the lift port and configured and dimensioned such that when the auxiliary axle is lifted no brake application pressure signal is allowed to pass to the delivery port, and when the auxiliary axle is not lifted a brake application pressure signal is allowed to pass to the delivery port;
      a modulator piston operatively connected to the control port, supply port, and delivery port, wherein, the modulator piston has an upper surface separated into distinct areas configured to receive a percentage of the brake application pressure signal, and a lower surface of the modulator piston operatively connected to the supply port and the delivery port such that when a brake application pressure signal is applied to the upper surface of the modulator piston, a modulated pressure signal is delivered through the delivery port to the anti-lock brake system of the auxiliary axle;
   a modulator piston operatively connected to the control port, supply port, and delivery port, wherein,
   the upper surface of the modulator piston is separated into distinct areas configured to receive a percentage of the brake application pressure signal,
   the lower surface of the modulator piston is 100% of the sum of the areas of the upper surface of the modulator piston, and
   the lower surface of the modulator piston is operatively connected to the supply port and the delivery port such that when a brake application pressure signal is applied to the upper surface of the modulator piston, a modulated pressure signal is delivered through the delivery port to the anti-lock brake system of the auxiliary axle;
      a second piston, spring, and valve configuration operatively connected to the control port, ride port, and modulator piston, wherein,
   when the pressure signal from the ride springs is less than a certain threshold $X_1$, a brake application pressure signal is only delivered to a certain distinct area of the upper surface of the modulator piston;
   when the pressure signal from the ride springs is greater than a certain threshold $X_1$, but less than a certain threshold $X_2$, the brake application pressure signal is delivered to more than one distinct area of the upper surface of the modulator piston; and
   when the pressure signal from the ride springs is greater than a certain threshold $X_2$, a brake application pressure signal is delivered to more than two distinct areas of the upper surface of the modulator piston.

15. The modulator valve according to claim 14, wherein the upper surface of the modulator piston is separated into at least three distinct areas.

16. The modulator valve according to claim 14, wherein when the pressure signal from the ride springs is less than $X_1$, the pressure signal delivered to the anti-lock brake system of the auxiliary axle by the valve is 25% of the brake application pressure signal.

17. The modulator valve according to claim 14, wherein when the pressure signal from the ride springs is greater than $X_1$, the pressure signal delivered to the anti-lock brake system of the auxiliary axle by the valve is 50% of the brake application pressure signal.

18. The modulator valve according to claim 14, wherein when the pressure signal from the ride springs is greater than $X_2$, the pressure signal delivered to the anti-lock brake system of the auxiliary axle by the valve is 100% of the brake application pressure signal.

19. The modulator valve according to claim 14 further comprising a restricting orifice associated with the ride port to dampen vibration effects during operation.

* * * * *